(12) United States Patent
Zhang et al.

(10) Patent No.: US 11,632,393 B2
(45) Date of Patent: Apr. 18, 2023

(54) DETECTING AND MITIGATING MALWARE BY EVALUATING HTTP ERRORS

(71) Applicant: International Business Machines Corporation, Armonk, NY (US)

(72) Inventors: Jialong Zhang, White Plains, NY (US); Jiyong Jang, Chappaqua, NY (US); Marc Philippe Stoecklin, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 17/072,711

(22) Filed: Oct. 16, 2020

(65) Prior Publication Data

US 2022/0124102 A1 Apr. 21, 2022

(51) Int. Cl.
  *H04L 9/40* (2022.01)
  *G06N 20/00* (2019.01)

(52) U.S. Cl.
  CPC ........... *H04L 63/145* (2013.01); *G06N 20/00* (2019.01); *H04L 63/1416* (2013.01); *H04L 63/1425* (2013.01)

(58) Field of Classification Search
  USPC ...................................................... 726/22–25
  See application file for complete search history.

(56) References Cited

U.S. PATENT DOCUMENTS 9,231,965 B1 * 1/2016 Vasseur ..................... G06N 3/08
9,710,646 B1 * 7/2017 Zhang ..................... G06F 21/56
10,855,698 B2 * 12/2020 Anderson ........... H04L 63/1425
10,911,483 B1 * 2/2021 Wasiq ..................... H04L 67/02
11,032,314 B2 * 6/2021 McGrew ............... H04L 63/126

(Continued)

OTHER PUBLICATIONS

Perdisci et al.; Behavioral Clustering of HTTP-Based Malware and Signature Generation Using Malicious Network Traces; usenix.org (Year: 2010).*

(Continued)

*Primary Examiner* — Kambiz Zand
*Assistant Examiner* — Mahabub S Ahmed
(74) *Attorney, Agent, or Firm* — Jeffrey S. LaBaw; David H. Judson

(57) ABSTRACT

Malware is detected and mitigated by differentiating HTTP error generation patterns between errors generated by malware, and errors generated by benign users/software. In one embodiment, a malware detector system receives traffic that includes HTTP errors and successful HTTP requests. Error traffic and the successful request traffic are segmented for further analysis. The error traffic is supplied to a clustering component, which groups the errors, e.g., based on their URI pages and parameters. During clustering, various statistical features are extracted (as feature vectors) from one or more perspectives, namely, error provenance, error generation, and error recovery. The feature vectors are supplied to a classifier component, which is trained to distinguish malware-generated errors from benign errors. Once trained, the classifier takes an error cluster and its surrounding successful HTTP requests as inputs, and it produces a verdict on whether a particular cluster is malicious. The classifier output then drives an automated mitigation operation.

24 Claims, 5 Drawing Sheets

(56) References Cited

U.S. PATENT DOCUMENTS

| | | | | |
|---|---|---|---|---|
| 2011/0283361 | A1* | 11/2011 | Perdisci | G06F 21/56 726/24 |
| 2013/0036468 | A1* | 2/2013 | Georgiev | G06F 21/51 726/23 |
| 2013/0312097 | A1 | 11/2013 | Turnbull | |
| 2014/0165198 | A1* | 6/2014 | Altman | G06F 21/561 726/23 |
| 2017/0085583 | A1* | 3/2017 | Torres | H04L 63/14 |
| 2017/0250953 | A1* | 8/2017 | Jain | G06F 21/552 |
| 2017/0264626 | A1* | 9/2017 | Xu | H04L 63/145 |
| 2018/0007084 | A1* | 1/2018 | Reddy | H04L 63/1425 |
| 2019/0014141 | A1* | 1/2019 | Segal | H04L 63/1483 |
| 2019/0020663 | A1* | 1/2019 | Bartos | G06N 20/00 |
| 2019/0182273 | A1* | 6/2019 | Walsh | H04L 63/1441 |
| 2019/0230116 | A1* | 7/2019 | Compton | H04L 63/1458 |
| 2019/0245866 | A1* | 8/2019 | Anderson | H04L 63/1425 |
| 2020/0186563 | A1* | 6/2020 | Convertino | G06N 20/00 |
| 2020/0204569 | A1* | 6/2020 | Komarek | G06N 3/08 |
| 2020/0280536 | A1* | 9/2020 | Kleopa | H04L 47/2441 |
| 2020/0358814 | A1* | 11/2020 | Willey | H04L 63/0236 |
| 2020/0389469 | A1* | 12/2020 | Litichever | H04L 63/029 |
| 2020/0412761 | A1* | 12/2020 | Luo | H04L 63/1458 |
| 2021/0185083 | A1* | 6/2021 | Azaria | H04L 63/1458 |
| 2022/0046057 | A1* | 2/2022 | Kutt | H04L 63/1483 |

OTHER PUBLICATIONS

Aresu, et al.; Clustering Android Malware Families by Http Traffic; IEEE (Year: 2015).*

Cai et al.; Detecting HTTP Botnet with Clustering Network Traffic; IEEE (Year: 2012).*

Zhang, et al.; Error-Sensor: Mining Information from HTTP Error Traffic for Malware Intelligence; Springer, nsf.gov (Year: 2018).*

Kheir; Analyzing HTTP User Agent Anomalies for Malware Detection; DPM 2012 and SETOP 2012, (Year: 2012).*

Ogawa*, et al.; Malware Originated HTTP Traffic Detection Utilizing Cluster Appearance Ratio; IEEE (Year: 2017).*

Perdisci, et al, Behavioral Clustering of HTTP-Based Malware and Signature Generation Using Malicious Network Traces, Proceedings of the 7th USENIX conference on Networked systems design and implementation, 2010.

Zhang et al, "Systematic Mining of Associated Server Herds for Malware Campaign Discovery," IEEE 35th International Conference on Distributed Computing Systems, 2015.

Zhang, et al, "Error-Sensor: Mining Information from HTTP Error Traffic for Malware Intelligence," International Symposium on Research in Attacks, Intrusions, and Defenses, 2018.

* cited by examiner

| CATEGORY | FEATURES |
|---|---|
| ERROR PROVENANCE | CLIENT REPUTATION ($f_1$) — 702<br>SERVER REPUTATION ($f_2$) — 704<br>SOFTWARE ERROR RATIO ($f_3$) — 706<br>ACCIDENTAL ERROR RATIO ($f_4$) — 708<br>REFERER ERROR RATIO ($f_5$) — 710<br>SUSPICIOUS SERVER RATIO ($f_6$) — 712 |
| ERROR GENERATION | SEQUENCE ($f_7$) — 716<br>$PERIOD_{min}$ ($f_8$) — 718<br>$PERIOD_{median}$ ($f_9$) — 720<br>$PERIOD_{max}$ ($f_{10}$) — 722<br>$FREQUENCY_{min}$ ($f_{11}$) — 724<br>$FREQUENCY_{median}$ ($f_{12}$) — 726<br>$FREQUENCY_{max}$ ($f_{13}$) — 728<br>$BATCH_{min}$ ($f_{14}$) — 730<br>$BATCH_{median}$ ($f_{15}$) — 732<br>$BATCH_{max}$ ($f_{16}$) — 734 |
| ERROR RECOVERY | TEMPORAL CORRELATION ($f_{17}$) — 738<br>URI PATH CORRELATION ($f_{18}$) — 740 |

700 — Error Provenance; 714 — Error Generation; 736 — Error Recovery

FIG. 7

DETECTING AND MITIGATING MALWARE BY EVALUATING HTTP ERRORS

BACKGROUND OF THE INVENTION

Technical Field

This disclosure relates generally to securing resources in a distributed computing environment.

Background of the Related Art

Malware often encounters network failures when it launches malicious activities, such as connecting to compromised servers that have been already taken down, connecting to malicious servers that are blocked based on access control policies in enterprise networks, or scanning/exploiting vulnerable web pages. To overcome such failures and improve the resilience in light of such failures, malware authors have employed various strategies, e.g., connecting to multiple backup servers or connecting to benign servers for initial network connectivity checks. These network failures and recovery strategies lead to distinguishing traits.

To defend against the sophisticated cybercrime systems, most, if not all organizations have already deployed a variety of security products to detect and block the malicious servers. Blacklists and intrusion detection systems (IDS) are widely deployed in most companies. Several modern domain reputation systems are also designed to search for the evidence of malicious activities observed at the domain names. The competition of such sophisticated evasion techniques deployed by cyber criminals and advanced detection systems deployed by companies typically results in two kinds of server connectivity failures in an enterprise network: DNS failures, and HTTP errors—typically HTTP connection failures whose response status codes are larger than 400, as defined by the HTTP standard. DNS failures occur when malware tries to connect to non-existing domains, and they have been widely studied by researchers for malware detection.

Malware often generates HTTP errors in the course of malicious activities. Most of the errors are caused by connecting to benign servers with bad parameters, connecting to compromised servers that have already been cleaned, or scanning vulnerable webpages that have been removed/protected. HTTP errors are also commonly generated because of traffic blocks by the enterprise/ISP web proxy/gateway for policy violation or malware infection (e.g., HTTP 403 errors). When malware faces HTTP errors, it may start "recovery" behaviors to maintain the functionality of malicious infrastructures, and to ensure the reachability to the malicious infrastructure, such as by connecting to some benign servers for network connectivity testing or connecting to other alternative malicious servers; in contrast, benign users/software may have less or no pre-arranged recovery routines. Such recovery behaviors (by malware) may not be easily characterized by existing IDSes, and thus malware may bypass security products to successfully connect to their backup malicious servers.

BRIEF SUMMARY

According to an aspect of this disclosure, malware is detected and mitigated by differentiating HTTP error generation patterns (e.g., frequencies, sequences, and statistics) between HTTP errors generated by malware, and HTTP errors generated by benign users/software. In one embodiment, a malware detector and mitigation system receives an entire set of HTTP traffic as an input, i.e., HTTP traffic that includes HTTP errors and successful HTTP requests. A filtering component of the system preferably filters out noisy error traffic, and it then outputs the remaining HTTP error traffic and the successful HTTP request traffic (or some portion thereof) for further analysis. The HTTP error traffic is supplied to a clustering component, which groups the errors, e.g., based on their HTTP URI pages and parameters. Preferably, the errors sharing similar HTTP pages and parameter patterns are grouped together as an error cluster. During this process, preferably the clustering component extracts various characteristic features (as feature vectors) from one or more feature groupings associated with an error cluster, namely, error provenance, error generation, and error recovery. The error clusters and their feature vectors are supplied to a classifier component, which is trained to distinguish malware-generated errors from benign errors. In particular, the classifier takes the clusters of errors and their surrounding successful HTTP requests as inputs, and it produces a verdict on whether or not a particular error cluster is malicious. Upon detecting the malware, a mitigation component is then used to take an automated remediation action to prevent the malware (identified by the error cluster) from further compromising enterprise endpoints, from communicating with the attacker and sending out information, or the like.

The foregoing has outlined some of the more pertinent features of the disclosed subject matter. These features should be construed to be merely illustrative. Many other beneficial results can be attained by applying the disclosed subject matter in a different manner or by modifying the subject matter, as will be described below.

BRIEF DESCRIPTION OF THE DRAWINGS

For a more complete understanding of the subject matter herein and the advantages thereof, reference is now made to the following descriptions taken in conjunction with the accompanying drawings, in which:

FIG. 7 depicts a set of statistical features that characterize an HTTP error cluster according to an embodiment.

DETAILED DESCRIPTION OF AN ILLUSTRATIVE EMBODIMENT

Figure 1:
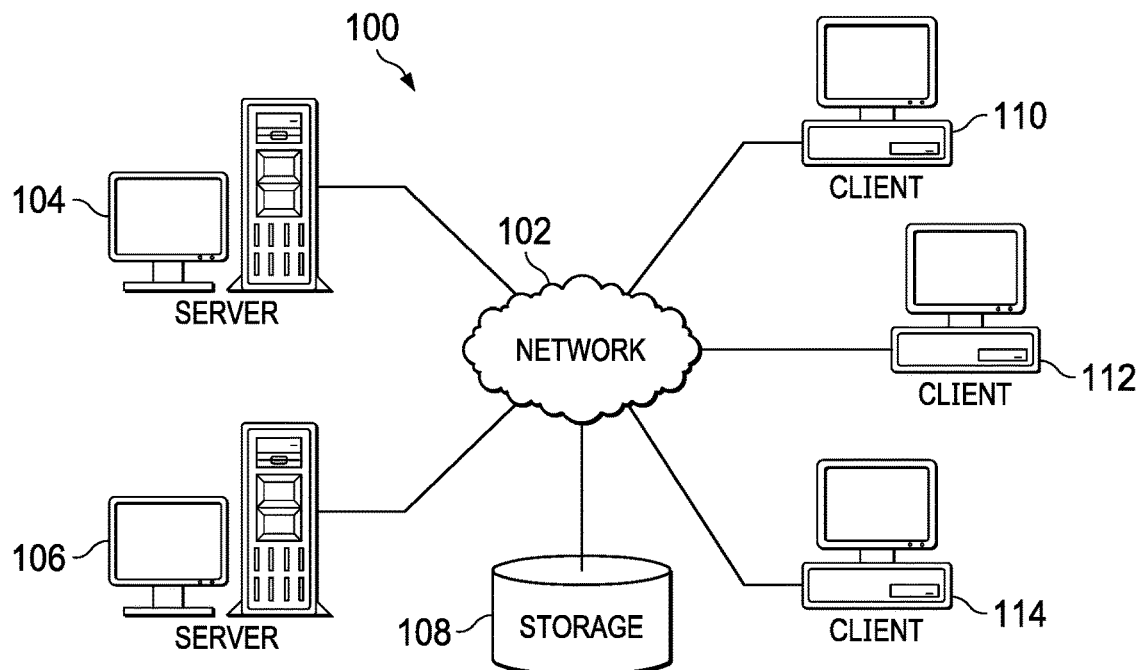
FIG. 1 depicts an exemplary block diagram of a distributed data processing environment in which exemplary aspects of the illustrative embodiments may be implemented.
Figure 2:
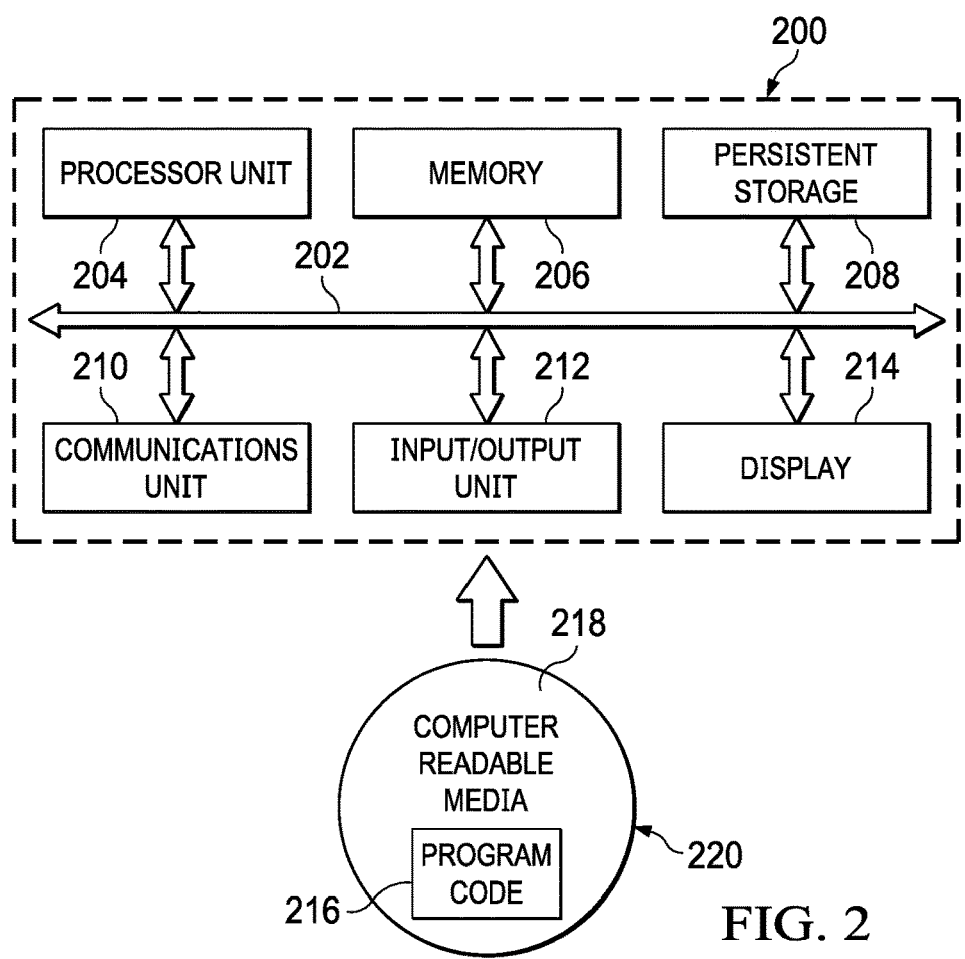
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the symmetric multi-processing (SMP) system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Security Intelligence Platform

Figure 3:
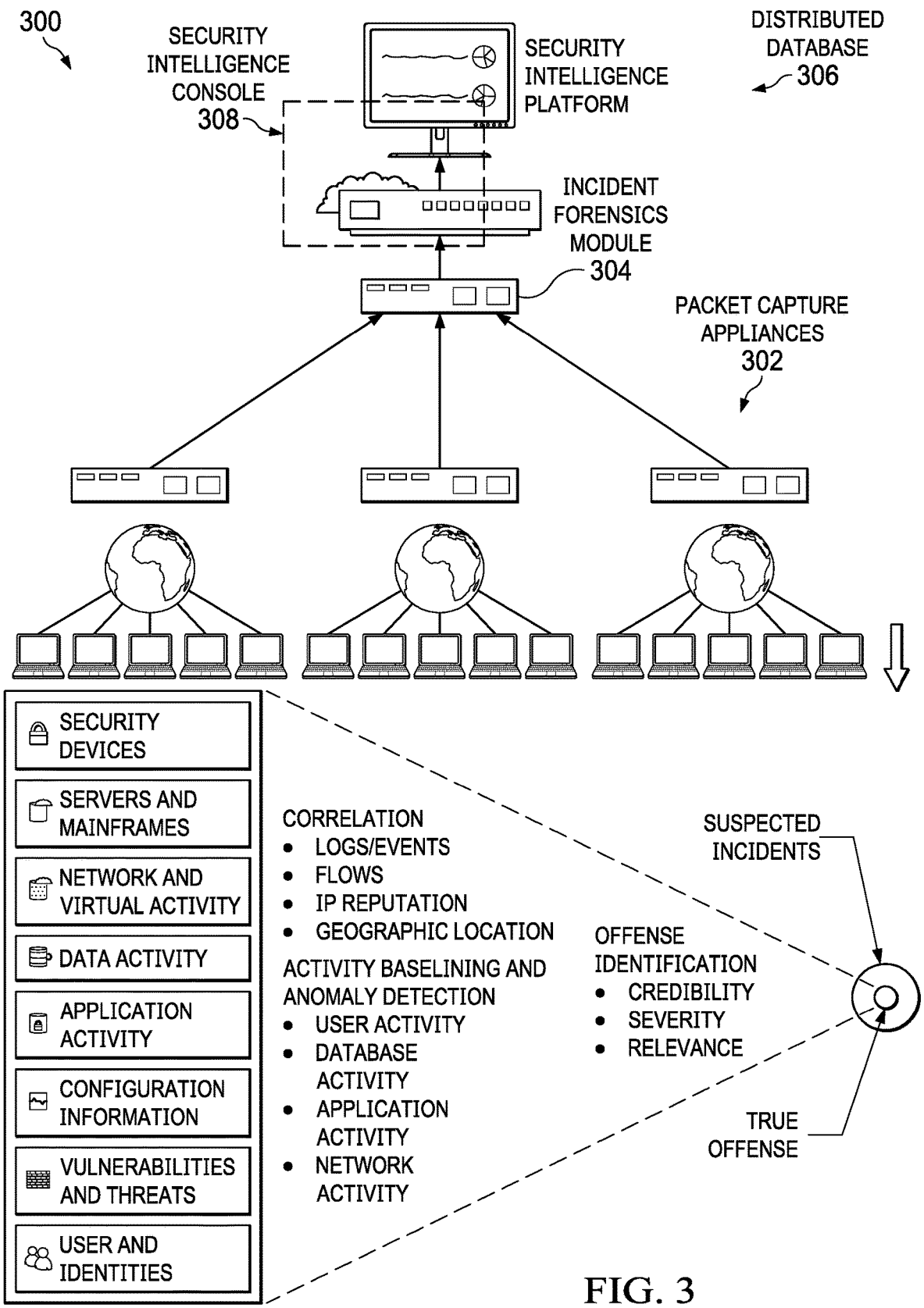
FIG. 3 illustrates a security intelligence platform in which the techniques of this disclosure may be practiced.

By way of background, a representative enterprise-based security intelligence platform in which aspects of this disclosure may be practiced is illustrated in FIG. 3.

Generally, the platform provides search-driven data exploration, session reconstruction, and forensics intelligence to assist security incident investigations. In pertinent part, the platform 300 comprises a set of packet capture appliances 302, an incident forensics module appliance 304, a distributed database 306, and a security intelligence console 308. The packet capture and module appliances are configured as network appliances, or they may be configured as virtual appliances. The packet capture appliances 302 are operative to capture packets off the network (using known packet capture (pcap) application programming interfaces (APIs) or other known techniques), and to provide such data (e.g., real-time log event and network flow) to the distributed database 306, where the data is stored and available for analysis by the forensics module 304 and the security intelligence console 308. A packet capture appliance operates in a session-oriented manner, capturing all packets in a flow, and indexing metadata and payloads to enable fast search-driven data exploration. The database 306 provides a forensics repository, which distributed and heterogeneous data sets comprising the information collected by the packet capture appliances. The console 308 provides a web- or cloud-accessible user interface (UI) that exposes a "Forensics" dashboard tab to facilitate an incident investigation workflow by an investigator. Using the dashboard, an investigator selects a security incident. The incident forensics module 304 retrieves all the packets (including metadata, payloads, etc.) for a selected security incident and reconstructs the session for analysis. A representative commercial product that implements an incident investigation workflow of this type is IBM® Security QRadar® Incident Forensics V7.2.3 (or higher). Using this platform, an investigator searches across the distributed and heterogeneous data sets stored in the database, and receives a unified search results list. The search results may be merged in a grid, and they can be visualized in a "digital impression" tool so that the user can explore relationships between identities.

Typically, an appliance for use in the above-described system is implemented is implemented as a network-connected, non-display device. For example, appliances built purposely for performing traditional middleware service oriented architecture (SOA) functions are prevalent across certain computer environments. SOA middleware appliances may simplify, help secure or accelerate XML and Web services deployments while extending an existing SOA infrastructure across an enterprise. The utilization of middleware-purposed hardware and a lightweight middleware stack can address the performance burden experienced by conventional software solutions. In addition, the appliance form-factor provides a secure, consumable packaging for implementing middleware SOA functions. One particular advantage that these types of devices provide is to offload processing from back-end systems. A network appliance of this type typically is a rack-mounted device. The device includes physical security that enables the appliance to serve as a secure vault for sensitive information. Typically, the appliance is manufactured, pre-loaded with software, and then deployed within or in association with an enterprise or other network operating environment; alternatively, the box may be positioned locally and then provisioned with standard or customized middleware virtual images that can be securely deployed and managed, e.g., within a private or an on premise cloud computing environment. The appliance may include hardware and firmware cryptographic support, possibly to encrypt data on hard disk.

Figure 4:
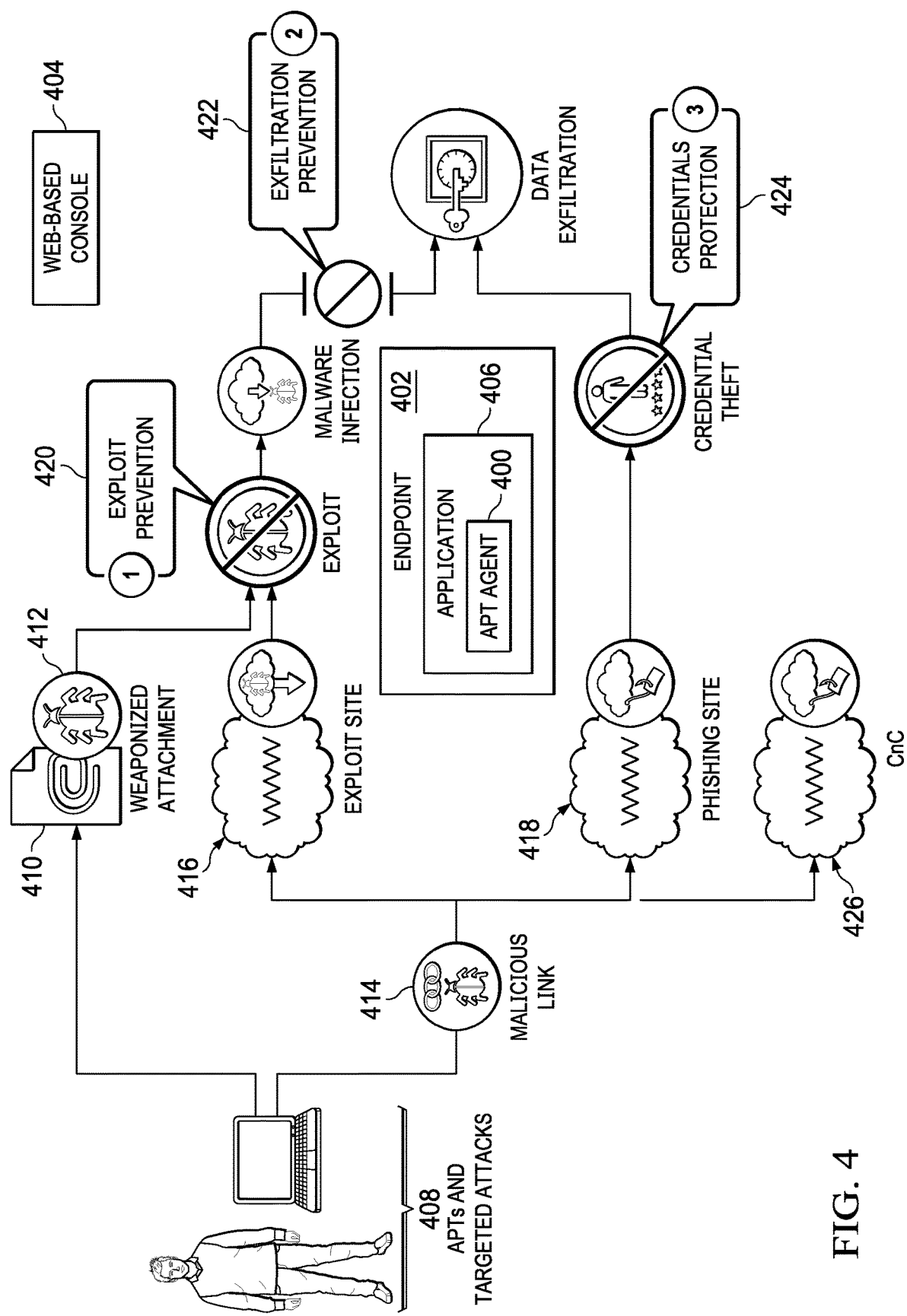
FIG. 4 depicts an Advanced Persistent Threat (APT) platform in which the techniques of this disclosure may be practiced.

An appliance of this type can facilitate Security Information Event Management (SIEM). For example, and as noted above, IBM® Security QRadar® SIEM is an enterprise solution that includes packet data capture appliances that may be configured as appliances of this type. Such a device is operative, for example, to capture real-time Layer 4 network flow data from which Layer 7 application payloads may then be analyzed, e.g., using deep packet inspection and other technologies. It provides situational awareness and compliance support using a combination of flow-based network knowledge, security event correlation, and asset-based vulnerability assessment. In a basic QRadar STEM installation, the system such as shown in FIG. 4 is configured to collect event and flow data, and generate reports. A user (e.g., an SOC analyst) can then investigate offenses to determine the root cause of a network issue.

Generalizing, Security Information and Event Management (SIEM) tools provide a range of services for analyzing, managing, monitoring, and reporting on IT security events and vulnerabilities. Such services typically include collection of events regarding monitored accesses and unexpected occurrences across the data network, and analyzing them in a correlative context to determine their contribution to profiled higher-order security events. They may also include analysis of firewall configurations, network topology and connection visualization tools for viewing current and potential network traffic patterns, correlation of asset vulnerabilities with network configuration and traffic to identify active attack paths and high-risk assets, and support of policy compliance monitoring of network traffic, topology and vulnerability exposures. Some SIEM tools have the ability to build up a topology of managed network devices such as routers, firewalls, and switches based on a transformational analysis of device configurations processed through a common network information model. The result is a locational organization which can be used for simulations of security threats, operational analyses of firewall filters, and other applications. The primary device criteria, however, are entirely network- and network-configuration based. While there are a number of ways to launch a discovery capability for managed assets/systems, and while containment in the user interface is semi-automatically managed (that is, an approach through the user interface that allows for semi-automated, human-input-based placements with the topology, and its display and formatting, being data-driven based upon the discovery of both initial configurations and changes/deletions in the underlying network), nothing is provided in terms of placement analytics that produce fully-automated placement analyses and suggestions.

Advanced Persistent Threat (APT) Prevention

By way of additional background, APT mitigation and prevention technologies are well-known. For example, IBM® Trusteer Apex® is an automated solution that prevents exploits and malware from compromising enterprise endpoints and extracting information. A solution of this type typically provides several layers of security, namely, exploit prevention, data exfiltration prevention, and credentials protection.

FIG. 4 depicts a typical embodiment, wherein the APT solution is architected generally as agent code 400 executing in enterprise endpoint 402, together with a web-based console 404 that enables IT security to manage the deployment (of both managed and unmanaged endpoints) from a central control position. The agent code 400 operates by monitoring an application state at the time the application 406 executes sensitive operations, e.g., writing a file to the file system. Generally, the agent 400 uses a whitelist of legitimate application states to verify that the sensitive operation is executed (or not) under a known, legitimate state. An exploit will attempt to execute sensitive operations under an unknown (not whitelisted) state, thus it will be stopped. The approach enables the APT agent to accurately detect and block both known and zero-day exploits, without knowing anything about the threat or the exploited vulnerability. The "agent" may be any code-based module, program, process, component, thread or the like.

FIG. 4 depicts how APT attacks typically unfold and the points at which the APT solution is operative to stop the intrusion. For example, here the attacker 408 uses a spear-phishing email 410 to send an employee a weaponized document, one that contains hidden exploit code 412. When the user opens the document with a viewer, such as Adobe Acrobat or Word, the exploit code runs and attaches to an application vulnerability to silently download malware on the employee computer 402. The employee is never aware of this download. Another option is to send a user a link 414 to a malicious site. It can be a malicious website 416 that contains an exploit code or a legitimate website that was compromised (e.g., through a watering hole attack). When the employee clicks the link and the browser renders the HTML content, the exploit code runs and latches onto a browser (or browser plug-in) vulnerability to silently download malware on the employee computer. The link can also direct the user to a phishing site (like a fake web app login page) 418 to convince the user to submit corporate credentials. After infecting the computer 402 with advanced malware or compromising corporate credentials, attacker 408 has established a foothold within the corporate network and then can advance the attack.

As depicted, the agent 400 protects the enterprise against such threats at several junctions: (1) exploit prevention 420 that prevents exploiting attempts from compromising user computers; (2) exfiltration prevention 422 that prevents malware from communicating with the attacker and sending out information if the machine is already infected with malware; and (3) credentials protection 424 that prevent users from using corporate credentials on non-approved corporate sites (including phishing or and public sites like social networks or e-commerce, for example). In one known approach, the agent performs these and related operations by monitoring the application and its operations using a whitelist of legitimate application states.

By way of additional background, information-stealing malware can be directly installed on endpoints by the user without requiring an exploit. To exfiltrate data, typically the malware must communicate with the Internet directly or through a compromised application process. Advanced malware uses a few evasion techniques to bypass detection. For example, it compromises another legitimate application process and might communicate with the attacker over legitimate websites (like Forums and Google Docs). The agent 400 is also operative to stop the execution of untrusted code that exhibits data exfiltration states. To this end, preferably it validates that only trusted programs are allowed to use data exfiltration techniques to communicate with external networks. The agent preferably uses several techniques to identify unauthorized exfiltration states and malicious communication channels, and blocks them. Because it monitors the activity on the host itself, it has good visibility and can accurately detect and block these exfiltration states.

The reference herein to the identified commercial product is not intended to be limiting, as the approach herein may be implemented with any APT solution or functionality (even if embedded in other systems).

Cognitive Cybersecurity Analytics

Figure 5:
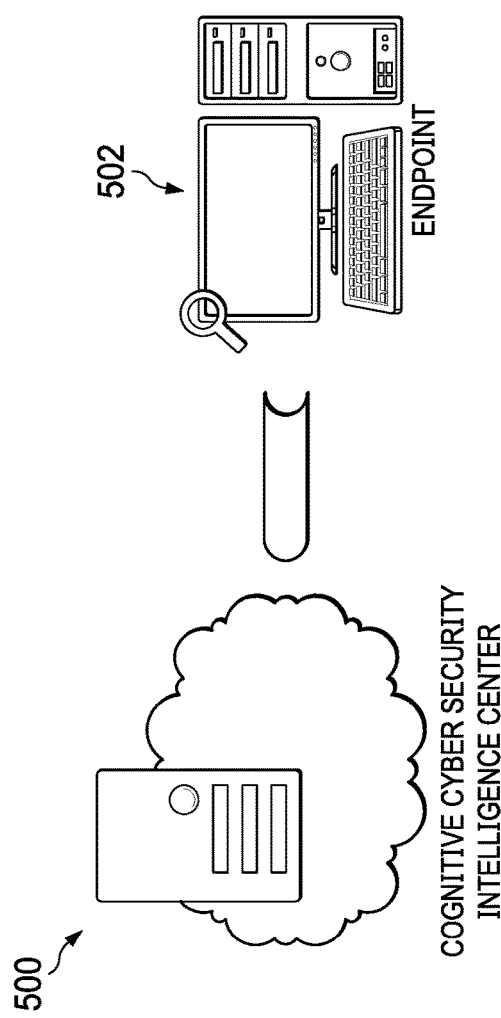
FIG. 5 illustrates an operating environment in which a cognitive cybersecurity intelligence center is used to manage an endpoint machine and in which the techniques of this disclosure may be implemented.

As still additional background, FIG. 5 depicts a basic operating environment that includes a cognitive cybersecurity intelligence center 500, and an endpoint 502. An endpoint 502 is a networked device that runs systems management code (software) that enables management and monitoring of the endpoint by the intelligence center 500, which may be hosted in a cloud compute environment.

The endpoint typically is a data processing system, such as described above in FIG. 2. The intelligence center 500 may be implemented as a security management platform such as depicted in FIG. 3, in association with an APT solution such as depicted in FIG. 4, or in other management solutions. Thus, for example, known commercial products and systems that provide endpoint management include IBM® BigFix®, which provides system administrators with remote control, patch management, software distribution, operating system deployment, network access protection and hardware and software inventory functionality. A commercial system of this type may be augmented to include the endpoint inter-process activity extraction and pattern matching techniques, or such techniques may be implemented in a product or system dedicated for this purpose.

In a typical implementation, an endpoint is a physical or virtual machine or device running an operating system such as Windows, Mac OSX, Vmware ESX, Linux, Unix, as various mobile operating systems such as Windows Phone, Symbian, iOS and Android. The cybersecurity intelligence center typically operates as a network-accessible security management platform comprising a plurality of machines and application software. Typically, the intelligence center supports cybersecurity analytics, e.g., using machine learning and the like. The intelligence center may operate in a dedicated manner to support a plurality of endpoints, or "as-a-service" on behalf of multiple enterprises each having their own endpoints. Typically, endpoint machines communicate with the intelligence center in a client-server paradigm, such as depicted in FIG. 1 and described above. The intelligence center may be located and accessed in a cloud-based operating environment.

In this approach, events, such as inter-process, events are sent from endpoints, such as endpoint 502, to a detection server executing in the intelligence center 500, where such events are analyzed. Preferably, attack detection occurs in the detection server. This approach provides for an efficient, systematic (as opposed to merely ad hoc) mechanism to record endpoint activities, e.g., via inter-process events, to describe a malicious or suspicious behavior of interest with abstractions (network graphs), and to match concrete activities (as represented in the recorded events) with abstract patterns. This matching enables the system to act upon malicious/suspicious behaviors (e.g., by halting involved processes, alerting, dropping on-going network sessions, halting on-going disk operations, and the like), as well as to assist security analysts to locate interesting activities (e.g., threat hunting) or to determine a next step that may be implemented in a workflow to address the suspect or malicious activity.

In this approach, typically both direct and indirect inter-process activities are extracted at endpoints and compared with pre-defined malicious behavior patterns for detection. Direct and indirect inter-process activities typically include control flow, such as process spawn, and information exchange via channels, such as files, sockets, messages, shared memory and the like. Inter-process activities reveal goals of processes and their particular execution paths. In the approach, they are matched against malicious inter-process behaviors for detecting attack instances. Preferably, the malicious behavior patterns are pre-defined with abstraction to characterize key steps in cyberattacks. These malicious behavior patterns typically are stored in an endpoint, and they can be updated as necessary.

Detecting Malware Behavior Based on HTTP Errors

With the above as background, the techniques of this disclosure are now described. As previously referenced, the approach herein detects malware behavior based on HTTP errors. As used herein, "HTTP errors" typically are HTTP connection failures whose response status codes are larger than 400 (namely, the 4xx class of status code), as defined by the HTTP standard (RFC 7231). A typical HTTP error is sent to the client web browser from a website when a problem is encountered while accessing a webpage. As is well-known, HTTP errors often occur when malware connects to compromised servers that have been cleared by administrators (e.g., resulting in an HTTP 404 Not Found error), or to malicious servers that are blocked by an IDS or a web proxy (e.g., resulting in an HTTP 403 Forbidden error) based on the policy violation. Based on empirical study, it has been determined that malware often generates HTTP errors in the course of malicious activities. Most of the errors are caused by connecting to benign servers with bad parameters, connecting to compromised servers that have already been cleaned, or scanning vulnerable webpages that have been removed/protected. HTTP errors are also commonly generated because of the traffic blocks by the enterprise/ISP web proxy/gateway for policy violation or malware infection (e.g., 403 errors). Accordingly, inspecting HTTP errors helps find out malware intelligence. When malware faces HTTP errors, it may start "recovery" behaviors to maintain the functionality of malicious infrastructures, and to ensure the reachability to the malicious infrastructure, such as by connecting to some benign servers for network connectivity testing or connecting to other alternative malicious servers. Such recovery behaviors may not be easily characterized by existing IDSes, and thus malware may bypass security products to successfully connect to their backup malicious servers.

Figure 6:
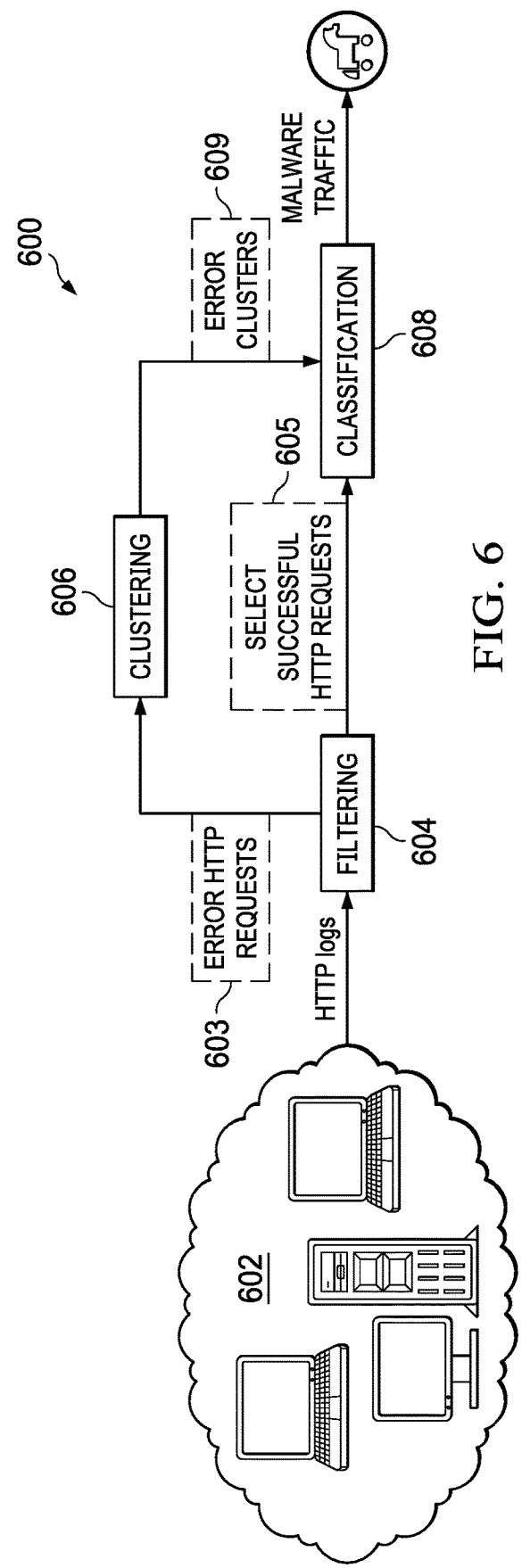
FIG. 6 depicts a malware detector system of this disclosure.

As also previously noted, the basic approach of this disclosure detects malware by differentiating HTTP error generation patterns (e.g., frequencies, sequences, and statistics) between HTTP errors generated by malware, and HTTP errors generated by benign users/software. In one embodiment, and as depicted in FIG. 6, a malware detector system 600 receives an entire set of HTTP traffic as an input, i.e., HTTP traffic that includes HTTP errors and successful HTTP requests. The malware detector system 600 may operate in a standalone manner or be a component of (or work in association with) the security intelligence platform (FIG. 3), the APT solution (FIG. 4), the analytics platform-based solution (FIG. 5). Representative HTTP traffic is obtained from HTTP logs, e.g., that are maintained in association with a set of computing devices 602, e.g., in an enterprise. The malware detector system 600 typically includes a set of components that are depicted as distinct components, although one or more of these components may be integrated with one another or leverage resources from other systems. As shown, the detector system 600 comprises a filtering component 604, a clustering component 606, and a classification (or "classifier") component 608.

The filtering component 604 is configured to filter out noisy error traffic. The goal of filtering is to reduce the amount of traffic to be processed, and to filter out "noisy" errors, which for convenience are defined as errors generated by clients who generate only a single error during an entire observation window (e.g., one (1) day). The observation window may vary of course. More formally, the filtering component 604 preferably filters out all the successful request traffic except for the successful requests within a time window $T_w$ of error traffic. All the remaining HTTP requests are then denoted in a form, such as ⟨$client_i$, $server_j$, $page_k$, error code⟩. The filtering component 604 outputs for further analysis the remaining HTTP traffic as error traffic 603, and successful HTTP request traffic 605. As depicted, these data sets are processed through different paths.

In particular, the HTTP error traffic 603 is supplied to the clustering component 606, while the successful HTTP requests 605 selected by the filtering component 604 are provided to the classification component 608. As will be described, the classifier component 608 also receives an output (error clusters 609) provided by the clustering component 606. The basic operation of the clustering component 606 is take the filtered error traffic 603, and to cluster the data into groups, namely, the error clusters 609. A rationale behind this operation is that when facing errors, malware may start recovery behaviors, which would result in similar errors or similar successful connections. Because the approach herein preferably relies on analyzing the recovery behaviors generated by the same client, preferably the errors are grouped by the clustering component 606 on a per client basis rather than across different clients. In this way, the system is able to detect malware traffic even when there is only a single client infected.

To determine which errors are considered to be the same, one of several approaches may be used by the clustering component 606. A straightforward way is to consider errors to be the same only when their URLs, including paths, pages and parameter names, are exactly matched. For example, and during a vulnerable webpage scanning process, malware may send requests to multiple domains with the same target page files and the same exploit codes, or the clients may send requests to multiple compromised servers with the same compromised pages and parameters. On the other hand, certain malware campaigns may use obfuscated paths, such as Base64 or URL encoding for the page names. To address these various scenarios, preferably a threshold $T_{len}$ (e.g., 25) is set for the length of page names. If the length of a page name is shorter than the threshold, the clustering component considers it unlikely that the page name is obfuscated, and it then groups errors based on page names and parameters. On the other hand, if the length of the page name exceeds the threshold, the page is considered to be obfuscated; in this case, the page name is then first decoded with a URL decoder, and then similar errors are grouped based on len(page name) and parameters. Preferably, and as an optimization, clusters with a single error are discarded, because most of these errors are caused by misconfiguration, e.g., where a client repeatedly sends the same requests to only one server.

Generalizing, the clustering component 606 groups errors based on their HTTP URI pages and parameters, and preferably the errors sharing similar HTTP pages and parameter patterns are grouped together. The output of the clustering component 606 then are the error clusters 609.

An error cluster has a set of defined characteristics (statistical features) according to various error-based categories, namely, provenance, generation and recovery. Generally, error provenance evaluates an overall reputation of an error cluster, error generation characterizes sub-groups of features extracted from error traffic in the cluster, and error recovery characterizes one or more error recovery patterns associated with the error cluster. A preferred set of defined characteristics is now described in additional detail, and with reference to FIG. 7.

As depicted, one set of features is an Error Provenance Pattern (EPP) feature group 700. This group of features characterizes the properties of error sources. Preferably, this category comprises a set of features for evaluating the overall reputation of an error cluster. In particular, Client Reputation (f1) 702 evaluates the client reputation of each cluster, which preferably is measured by the number of errors generated by the clients in a cluster. Typically, the number of errors generated by the clients includes the errors that were not initially clustered in the cluster, and that the value of client reputation may be larger than the actual size of the cluster. Malware infected clients usually generate more errors than benign clients. In terms of reputation, the more errors a client generates, the lower reputation the client has. Server Reputation (f2) 704 evaluates the reputation of servers in an error cluster, which preferably is measured by the average number of clients connecting to the servers. The more popular (i.e., more clients communicating with) a server is, the less likely the server is malicious. A Software Error Ratio (f3) 706 evaluates who generates errors, which preferably is defined by the number of custom (non-browser) User-Agents over the total number of errors in a cluster. Typically, a majority of benign errors are generated by custom (non-browser) User-Agents, while malware often used browser User-Agents typically remain stealthy. An Accidental Error Ratio (f4) 708 evaluates how errors are generated, which preferably is defined by the number of accidental errors over the total number of errors in a cluster. Malware often quickly gives up failed servers and moves on to other alternative servers, resulting in a high accidental error ratio. A Referrer Ratio (f5) 710 evaluates where errors are generated. A referrer provides information about the locations of the links from where a user reaches an error page. Most malware and benign software typically generate errors without referrers (i.e., direct requests), while users/browsers typically generate errors with referrers indicating the previous page of the error page. By default, a browser automatically adds a referrer field to each request. Preferably, the referrer ratio is defined as the number of unique referrers in a cluster divided by the number of errors in the cluster. Malware-generated errors would have zero or very low referrer ratio. A Suspicious Server Ratio (f6) 712 also measures the reputation of the servers in each error cluster. If a server generates only error traffic without any successful communication with its clients, Error-Sensor flags the server as suspicious. These servers might be less popular servers which only few clients visit and generate errors, or malicious servers blocked by an IDS. The suspicious server ratio preferably is defined as the number of suspicious servers divided by the total number of servers in the cluster. A higher suspicious server ratio in a cluster indicates that the cluster is more likely to be connected only by malware.

A second set of features is an Error Generation Pattern (EGP) feature group 714. This category of features preferably comprises several sub-groups of features extracted from error traffic. In particular, a Sequence Pattern (f7) 716 characterizes whether the errors in a cluster are generated in a sequence. The rationale behind the feature is that the errors generated from browsers and benign software often follow a certain sequence, while malware-generate errors are often observed in an arbitrary order. For example, a client may generate a series of HTTP 404 errors to outdated Ubuntu source repositories in the same sequence over time because a source list of update servers is fixed. Malware, however, may randomly select C&C servers to send requests, which leads to an arbitrary order of requests. A Period Pattern (f8, f9, and f10) measures the minimum time interval for malware to generate the same errors (repeated errors). The rationale here is that most user-generated errors do not yield repeated ones, and benign software-generated errors often have short time interval of generating the same errors. Malware, however, typically employs some delay before reconnecting to the failed server to avoid sudden traffic spikes. To characterize the timing pattern of repeated errors, preferably these features calculate the respective minimum 718, median 720, and maximum 722 values of the minimum time interval between repeated errors. A Frequency Pattern (f11, f12, and f13) measures how many recurring errors are generated for each error per day. Most benign errors are typically generated once or per usage. Malware, however, may periodically try to connect to malicious C&C servers to obtain new commands or updates. Considering not all of the errors in a cluster are repeated, these features assess the minimum 724, median 726, and maximum 728 of the error frequency for each cluster to characterize the error generating frequency. A Batch Pattern (f14, f15, and f16) measures the minimum time interval for malware to contact other alternative servers in a cluster. Most benign errors are often generated in a batch, while malware may generate errors with some delays to avoid sudden spikes and to evade possible detection. For example, a set of 404 Not Found errors are usually generated at once when a page includes lots of missing/outdated links for scripts and resources. Typically, the benign software quickly tries to reconnect to alternative servers in the face of errors. When malware faces errors, however, it may slowly complete its recovery behaviors (e.g., waiting one minute to send multiple requests), or delay sometime before contacting to other alternative servers to remain stealthy. For batch patterns, these features assess the minimum 730, median 732, and maximum 734.

The third set of features is an Error Recovery Pattern (ERP) feature group 736. This feature group comprises several features to characterize the error recovery patterns of malware in the face of errors. In particular, Temporal Correlation (f17) 738 characterizes the recovery behaviors of malware based on temporal correlation among errors and their nearby successful traffic. The rationale behind the feature is that when malware faces errors, it starts recovery mechanisms within a certain time. For example, malware may send requests to benign servers to check network connectivity after several failed connections to malicious servers. Therefore, if a server frequently appears together with error requests, it is highly likely to be a part of malware recovery routines.

To characterize temporal patterns, preferably a time window $T_w$ sets the correlation scope, and all the requests surrounding the errors within this time window are extracted. To quantify the temporal correlation, preferably association rule learning is then employed. In particular, the association rule learning finds the associated traffic with target errors. For each error traffic e, the system extracts surrounding traffic of e within $T_w$, defining them as an error bucket. In this way, all the traffic in the same error bucket is considered as related traffic, and a recurring error generates a set of error buckets. Then, for each error bucket, the system measures support Supp(X) and confidence Conf(X) in association rule mining to identify highly correlated traffic. Supp(X) of traffic set X is defined as the number of error buckets containing traffic set X, which reflects how frequently traffic X appears together with the target error e. Conf(X) is defined as Supp(X) over the frequency of traffic set X appearing in the traffic, Conf(X)=Supp(X)/Freq(X), where Freq(X) is the frequency of traffic X in the surrounding traffic of target error e. Therefore, if traffic set X frequently appears together with the target error e (i.e., high Supp(X)) and only appears together with target error e (i.e., high Conf(X)), traffic set X is greatly correlated with error e and is highly likely to be the traffic of recovery mechanisms for error e. As a result, temporal correlation feature returns True if Supp(X) is higher than threshold T_Supp, and Conf(X) is higher than threshold T_Conf; otherwise, it returns False. For the errors with the frequency less than a given number (e.g., two (2)), temporal correlation feature returns False because it is difficult to determine if they are truly correlated or not. The correlated traffic helps to identify backup malicious servers and to understand sophisticated evasion intelligence employed by malware.

Malware may evade temporal correlation by adding a large delay when facing errors. This can be addressed by tuning the $T_w$ threshold to handle the request with a larger delay at an extra processing time cost. To evade URL path correlation, malware requires to target different pages and to generate different parameters. Depending on the vulnerabilities and malicious activities, however, it is complicated for malware to change its attack patterns. For example, for scanning attacks on vulnerable pages, specially-crafted URI names and parameters cannot be changed; otherwise, the attack will not work.

Referring back to FIG. 7, URI Path Correlation (f18) 740 characterizes the recovery behaviors of malware based on URI pattern correlation among errors and their surrounding successful traffic. In this regard, it is noted that malware may generate the same requests to multiple servers to avoid a single point of failure. In this case, some malware traffic may lead to errors while others may be successful. For example, when malware connects to compromised servers, some of the compromised servers may have already been cleaned by administrators and lead to HTTP 404 errors, while others may redirect clients to malicious servers. Because both error traffic and successful traffic would have similar content patterns (e.g., pages and parameters), however, preferably this feature measures the similarity between traffic. If traffic set X is similar to target error e, path correlation feature returns True; otherwise, it returns False.

The above set of feature groups (including the various constituent feature selections) are not all required, as a particular error cluster may be characterized by one or more of the categories, and one or more particular features in a particular category. Different error clusters may be characterized by different categories and/or different feature sets among the categories. Referring now back to FIG. 6, the classifier component 608 takes as training input(s) the error clusters 609 and associated statistical features, together with their surrounding successful HTTP requests 605 (that were also output by the filtering component 602). Using machine learning, the classifier component 608 is then trained using the HTTP error information collected from the HTTP logs. In particular, machine learning involves using analytic models and algorithms that iteratively learn from data, thus allowing computers to find insights in the data without being explicitly programmed where to look. Machine learning may be supervised or unsupervised. Supervised machine learning involves using training examples by which the machine can learn how to perform a given task. Preferably, the classifier here is trained using supervised machine learning and, in particular, using a random forest classifier (RFC) for classification, as this classifier does not require parameter tuning and is robust in handling outliers. Other binary classification systems/algorithms may be used. The only two required parameters for RFC are the number of decision trees (Nt) and the number of features (Nf) per decision tree, and these parameters are independent of nuances of the data and have standard selection rules.

Once it has been trained, the malware detection system is then utilized with respect to new HTTP error traffic received by the system. In operation, the classifier component 608 operates generally to produce a verdict on whether a particular error cluster is malicious, thereby identifying the malware traffic. If the classifier determines that an error cluster is malicious, then preferably the system also outputs an identification its associated recovery servers based on the servers extracted through temporal and URI path correlation.

With respect to malware that has been identified by the system, the outputs identified by the classifier are then used to drive a remediation or mitigation functionality. In one embodiment, the outputs provide for control signaling to an APT mitigation system, such as depicted in FIG. 4. In particular, the identified error cluster and its associated recovery servers are identified to the APT agent, which then is updated in an automated manner and as necessary to prevent the malware (identified by the error cluster) from further compromising endpoints, from communicated with the attacker and sending out information, or the like. The nature and scope of the update depends on implementation but typically involves stopping execution of untrusted code that exhibits data exfiltration states, blocking access to the suspect and recovery servers, providing credentials updates, updating application whitelists, providing notifications, implementing code isolation (sandboxing), and the like. Preferably, the malware detection system interoperates with the mitigation system (e.g., the APT, or the security platform, or a cloud-based analytics platform) in an automated manner to provide the mitigation, using appropriate tooling, APIs and communications protocols to facilitate seamless and automated mitigation and remediation of the identified malware.

The technique provides significant advantages, primarily providing robust malware detection and mitigation. As has been described, the approach herein takes advantage of the fact that malware-infected clients typically generate more HTTP errors than benign clients, and it leverages the notion that there exist distinguishing error generation patterns (e.g., frequencies, sequences and statistics) between the errors generated by malware and the errors caused by benign users/software. The described system detects malware traffic, preferably in real-time or on-demand, with the detected outputs then used to drive appropriate automated mitigation and remediation. The approach herein is complementary to DNS failure-based detection, and it enables an enterprise to identify malicious servers that are compromising enterprise security. The technique enables an enterprise to defend itself against cyber-exploits.

Generalizing, the enhanced security system functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. As noted, the techniques herein may be practiced in whole or in part in a loosely-coupled server (including a "cloud"-based) environment. The security server itself (or functions thereof, such as the monitor process) may be hosted in the cloud.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the analytics engine functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

In a representative embodiment, the detection (filtering, clustering and classification) and mitigation components are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the system described above.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As already mentioned, the techniques disclosed herein are not limited to any particular processing environment, but this will be a typical implementation. As noted, the above-described function may be used in any system, device, portal, site, or the like wherein request query syntax may be changed, modified, updated or otherwise altered.

Further, the technique described herein is not limited for use with just HTTP, as the approach may also be used with respect to malware detection and mitigation with respect to malware that uses HTTPS to evade detection. For HTTPS detection, the approach herein may be implemented by deploying web proxy servers that perform SSL-MI™. Further, the malware detection and mitigation approach may be applied in other application schemes generally. Thus, while the depicted approach is a preferred operating environment, the approach may be implemented in any application scheme wherein application client requests are processed for potential security violations in the manner described.

As mentioned above, it is not required that the set of characteristics used to train the machine classifier all of the feature groups, or all of the features in the feature groups. Typically, only some subset of this information is used. Indeed, some features, such as suspicious server ratio (f6) and client reputation (f1), provide significant discrimination, and these features are also very robust in the sense that they are very difficult for an attacker to manipulate or control. Other features, such as periodmedian (f9) and periodmax (f10), also provide good discrimination but are less robust in the sense that an attacker may be able to manipulate the feature, albeit at some cost. Still other features, such as accident error ratio (f4), provide good discrimination but are not very robust from an attacker's modification or control. In a variant embodiment, a minimal set of features that are used to facilitate the machine learning are selected, where a feature in the set provides a good balance between ability to discriminate the error traffic, while also being robust.

A further extension of the techniques herein involves using the system as a first layer/tier to identify a possible malware infection, and then using that determination to trigger a second layer/tier that involves a more fine-grained analysis. In this approach, the HTTP error detection and classification described above provides a high performant (e.g., in real-time or substantially real-time) decision that a particular client (or IP address) may be compromised by malware, and this decision is then used to trigger the more detailed analysis. The more detailed analysis may then involve more comprehensive analysis of the relevant traffic obtained from the logs, e.g. analyzing the contents of that traffic using a deep packet inspection (DPI) or similar technique. As compared to the HTTP detection, content inspection and analysis is more computationally-intensive, and thus the second layer analysis may be performed off-line (or out-of-band) from the first layer. The addition of the second layer, however, provides additional advantages, especially where an attacker has gained knowledge of the one or more features that used for training and/or has the ability to manipulate or control such features. The decision when to use the second layer also may depend on one or more factors, such as a confidence level of the initial determination, the identity of the potentially-suspect client or the target server, the feature set used to train the classifier, and the like.

The techniques herein provide for improvements to another technology or technical field, namely, security systems, as well as improvements to the operational capabilities of such systems when used in the manner described.

Having described the subject matter, what is claimed is as follows:

1. A method of identifying and mitigating malware in association with an enterprise, comprising:
   receiving and segmenting Hypertext Transfer Protocol (HTTP) traffic into HTTP error traffic, and associated successful HTTP request traffic;
   clustering the HTTP error traffic to identify one or more error clusters, wherein an error cluster has an associated set of characteristics;
   based on the associated set of characteristics of the one or more error clusters and the associated successful HTTP request traffic, training a machine learning model to distinguish HTTP errors generated by malware, and HTTP errors generated by benign activity; and
   responsive to an output from the machine learning model identifying an error cluster associated with malware, identifying that a particular client or client address is potentially compromised by malware;
   performing a further analysis of the HTTP traffic associated with the particular client or client address to make a determination regarding whether a mitigation action should be taken; and
   based on the determination, automatically initiating the mitigation action.

2. The method as described in claim 1 wherein the HTTP error traffic is clustered based on HTTP Uniform Resource Identifier (URI) pages and parameters.

3. The method as described in claim 1 wherein the set of characteristics associated with an error cluster comprise at least one of: an error provenance feature group, an error generation feature group, and an error recovery feature group.

4. The method as described in claim 3 wherein the error provenance feature group characterizes a reputation of an error cluster.

5. The method as described in claim 3 wherein the error generation feature group characterizes a given error generation pattern associated with an error cluster, the given error generation pattern being one of: a sequence pattern, a period pattern, a frequency pattern, and a batch pattern.

6. The method as described in claim 3 wherein the error recovery feature group characterizes a given error recovery pattern associated with an error cluster, the given error recovery pattern being one of: a temporal correlation, and a Uniform Resource Identifier (URI) path correlation.

7. The method as described in claim 1 further including:
identifying a subset of the characteristics of the one or more error clusters, wherein the subset is identified by balancing one or more characteristics that have been determined to discriminate error traffic, and one or more characteristics that have been determined to be difficult for an attacker to manipulate; and
using the identified subset of the characteristics to train the machine learning model.

8. The method as described in claim 1 wherein the mitigation action is one of: stopping execution of untrusted code that exhibits data exfiltration states, blocking access to suspect and recovery servers, providing credentials updates, updating application whitelists, providing notifications, and implementing application sandboxing.

9. Apparatus, comprising:
a processor;
computer memory holding computer program instructions executed by the processor to identify and mitigate malware in association with an enterprise, the computer program instructions comprising program code configured to:
receive and segment Hypertext Transfer Protocol (HTTP) traffic into HTTP error traffic, and associated successful HTTP request traffic;
cluster the HTTP error traffic to identify one or more error clusters, wherein an error cluster has an associated set of characteristics;
based on the associated set of characteristics of the one or more error clusters and the associated successful HTTP request traffic, train a machine learning model to distinguish HTTP errors generated by malware, and HTTP errors generated by benign activity; and
responsive to an output from the machine learning model identifying an error cluster associated with malware, identifying that a particular client or client address is potentially compromised by malware;
performing a further analysis of the HTTP traffic associated with the particular client or client address to make a determination regarding whether a mitigation action should be taken; and
based on the determination, automatically initiate the mitigation action.

10. The apparatus as described in claim 9 wherein the HTTP error traffic is clustered based on HTTP Uniform Resource Identifier (URI) pages and parameters.

11. The apparatus as described in claim 9 wherein the set of characteristics associated with an error cluster comprise at least one of: an error provenance feature group, an error generation feature group, and an error recovery feature group.

12. The apparatus as described in claim 11 wherein the error provenance feature group characterizes a reputation of an error cluster.

13. The apparatus as described in claim 11 wherein the error generation feature group characterizes a given error generation pattern associated with an error cluster, the given error generation pattern being one of: a sequence pattern, a period pattern, a frequency pattern, and a batch pattern.

14. The apparatus as described in claim 11 wherein the error recovery feature group characterizes a given error recovery pattern associated with an error cluster, the given error recovery pattern being one of: a temporal correlation, and a Uniform Resource Identifier (URI) path correlation.

15. The apparatus as described in claim 9 wherein the computer program code configured to train the machine learning model is configured to:
identify a subset of the characteristics of the one or more error clusters, wherein the subset is identified by balancing one or more characteristics that have been determined to discriminate error traffic, and one or more characteristics that have been determined to be difficult for an attacker to manipulate; and
use the identified subset of the characteristics to train the machine learning model.

16. The apparatus as described in claim 9 wherein the program code configured to take the mitigation action is program code configured to perform one of: stopping execution of untrusted code that exhibits data exfiltration states, blocking access to suspect and recovery servers, providing credentials updates, updating application whitelists, providing notifications, and implementing application sandboxing.

17. A computer program product in a non-transitory computer readable medium, the computer program product holding computer program instructions executed by a processor to identify and mitigate malware in association with an enterprise, the computer program instructions comprising program code configured to:
receive and segment Hypertext Transfer Protocol (HTTP) traffic into HTTP error traffic, and associated successful HTTP request traffic;
cluster the HTTP error traffic to identify one or more error clusters, wherein an error cluster has an associated set of characteristics;
based on the associated set of characteristics of the one or more error clusters and the associated successful HTTP request traffic, train a machine learning model to distinguish HTTP errors generated by malware, and HTTP errors generated by benign activity; and
responsive to an output from the machine learning model identifying an error cluster associated with malware, identifying that a particular client or client address is potentially compromised by malware;
performing a further analysis of the HTTP traffic associated with the particular client or client address to make a determination regarding whether a mitigation action should be taken; and
based on the determination, automatically initiate the mitigation action.

18. The computer program product as described in claim 17 wherein the HTTP error traffic is clustered based on HTTP Uniform Resource Identifier (URI) pages and parameters.

19. The computer program product as described in claim 17 wherein the set of characteristics associated with an error cluster comprise at least one of: an error provenance feature group, an error generation feature group, and an error recovery feature group.

20. The computer program product as described in claim 19 wherein the error provenance feature group characterizes a reputation of an error cluster.

21. The computer program product as described in claim 19 wherein the error generation feature group characterizes a given error generation pattern associated with an error cluster, the given error generation pattern being one of: a sequence pattern, a period pattern, a frequency pattern, and a batch pattern.

22. The computer program product as described in claim 19 wherein the error recovery feature group characterizes a given error recovery pattern associated with an error cluster, the given error recovery pattern being one of: a temporal correlation, and a Uniform Resource Identifier (URI) path correlation.

23. The computer program product as described in claim 17 wherein the computer program code configured to train the machine learning model is configured to:
  identify a subset of the characteristics of the one or more error clusters, wherein the subset is identified by balancing one or more characteristics that have been determined to discriminate error traffic, and one or more characteristics that have been determined to be difficult for an attacker to manipulate; and
  use the identified subset of the characteristics to train the machine learning model.

24. The computer program product as described in claim 17 wherein the program code configured to take the mitigation action is program code configured to perform one of: stopping execution of untrusted code that exhibits data exfiltration states, blocking access to suspect and recovery servers, providing credentials updates, updating application whitelists, providing notifications, and implementing application sandboxing.

* * * * *